No. 881,729. PATENTED MAR. 10, 1908.
W. B. SMITH.
GEARING MECHANISM FOR BICYCLES, &c.
APPLICATION FILED JULY 19, 1907.

2 SHEETS—SHEET 1.

Witnesses
R. J. O. Beall
W. S. Duvall

Wm. B. Smith, Inventor
By John B. Thomas & Co.
Attorney

No. 881,729. PATENTED MAR. 10, 1908.
W. B. SMITH.
GEARING MECHANISM FOR BICYCLES, &c.
APPLICATION FILED JULY 19, 1907.
2 SHEETS—SHEET 2.
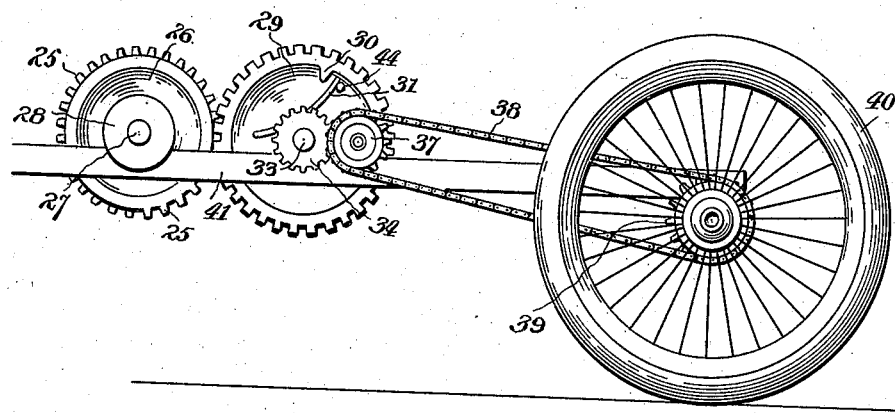
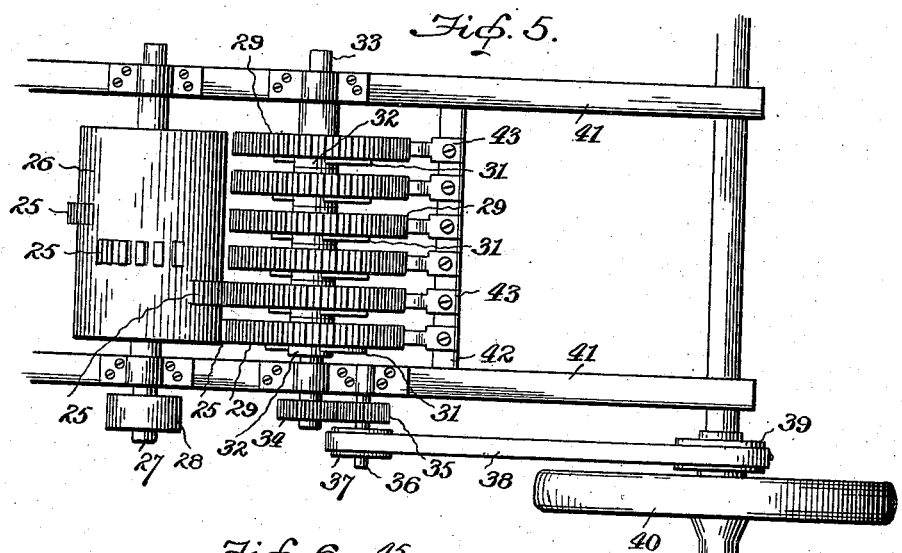
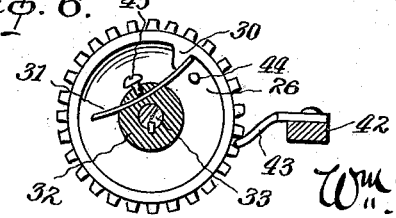

UNITED STATES PATENT OFFICE.

WILLIAM B. SMITH, OF GRAND LEDGE, MICHIGAN.

GEARING MECHANISM FOR BICYCLES, &c.

No. 881,729.	Specification of Letters Patent.	Patented March 10, 1908.

Application filed July 19, 1907. Serial No. 384,605.

*To all whom it may concern:*

Be it known that I, WILLIAM B. SMITH, a citizen of the United States, residing at Grand Ledge, in the county of Eaton and State of Michigan, have invented a Gearing for Bicycles, &c., of which the following is a specification.

This invention relates to gearing mechanism for bicycles, automobiles, etc., and is more especially an improvement in the transmission by means of which the power of the machine is increased under certain conditions or when additional power is required at a sacrifice of speed.

The primary object of my present invention is to provide a particular construction of gearing mechanism by means of which the power of the driving-shaft is transmitted to the driving-axle by parallel series of gears which intermesh successively and yieldingly so that the power may be more effectively applied and thereby adapt the bicycle or automobile to climb steep grades, etc.

A further object of my invention is to provide a transmission gear of this character which shall be simple and compact in its construction, light, strong and durable, easily applied, and which is not liable to get out of order.

With these principal objects in view my invention consists in the particular construction and combination of the parts constituting the transmission gear, all as hereinafter fully described and specifically set forth in the appended claims.

Figure 1:
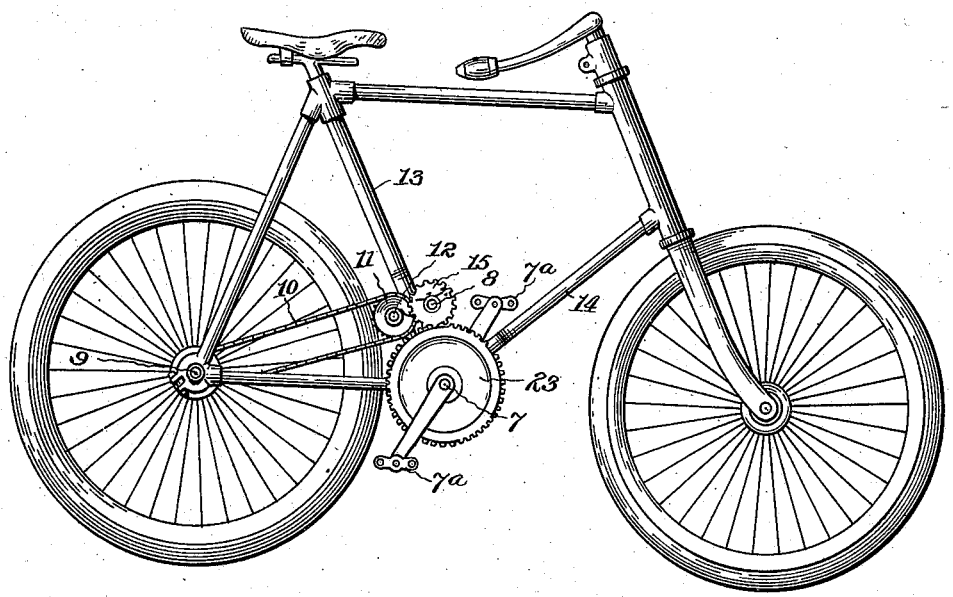
Figure 2:
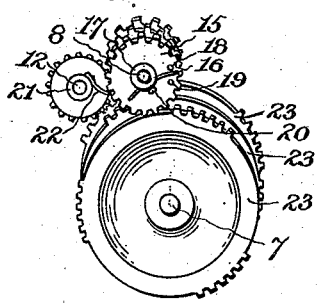
Figure 3:
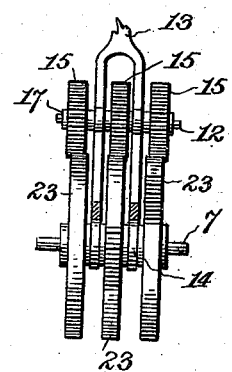

In the accompanying drawings, which form a part of this specification: Figure 1 is a side elevation illustrating the application of my invention to a bicycle. Fig. 2 is a perspective view, enlarged, showing the transmission gear. Fig. 3 is an end elevation of the transmission gear, and showing the manner of mounting same in a bicycle frame. Fig. 4 is a side elevation, showing the application of the invention to an automobile, and including a slight modification hereinafter referred to. Fig. 6 is a detail sectional view of one of the gear-wheels which form part of the transmission gear. Fig. 5 is a plan view of Fig. 4.

Like numerals of reference indicate like parts in all the figures of the drawings.

In Fig. 1 I have shown my improved transmission gear as applied to a bicycle, and in Figs. 4 and 5 have shown the application of the same in connection with the driving gear of an automobile; although it will be understood that I do not wish to limit its application to bicycles and automobiles, as it will be obvious the invention may be applied to machines of all kinds in which it is desired to so apply the power as to increase its efficiency under certain conditions.

Referring to Figs. 1, 2 and 3 of the drawings, 7 designates the driving-shaft, in this instance the crank-shaft of a bicycle, and 8 designates an auxiliary shaft to which the power is transmitted from the aforesaid driving-shaft, and which shaft 8 may be connected to a driving-axle, as 9, in any suitable manner, for instance by means of the sprocket-chain 10 and sprocket-wheels 11, one of the latter being mounted on a stub-shaft 12 and geared to the auxiliary shaft, while the other sprocket-wheel is fixed to the driving-axle, as is usual. The shafts 7, 8 and 12 are supported in bearings at the lower bifurcated ends of the frame-bars 13 and 14 of the bicycle, as shown in Fig. 3, and the cranks of the shaft 7 are provided with the usual pedals $7^a$.

Loosely mounted on the auxiliary shaft 8 are three gear-wheels 15, and each gearwheel is independently connected to turn the shaft by means of a flat spring bar 16 which is attached to a collar 17 splined to the shaft (see Fig. 6) and at its outer end is engaged by stops or lugs 18 and 19 projecting from the side of the gearwheel near the periphery thereof. The flat spring bar 16 is passed through an opening in the collar, said opening extending tangentially, and is secured therein by a set-screw 20 which is threaded in the collar and impinges against the spring bar. One of these gearwheels 15, preferably the center one, is in mesh with a gearwheel which is formed integrally with the sprocket-wheel 11, and said latter gearwheel and the connected sprocket-wheel turn loosely on the shaft 12 so that the latter may remain fixed or stationary, for the purpose hereinafter explained. Attached to the stationary shaft 12 are collars 21, and to each collar is attached a spring pawl 22, said pawls being adapted to engage the gearwheels 15 and prevent backward rotation of the same.

Fixedly secured to the crank-shaft 7 are three segmental gearwheels 23, which are arranged so as to mesh with the gearwheels 15 in the order hereinafter set forth. As shown only small segments of each gearwheel 23 are toothed, and the extent of the segmental toothed portions and the spaces between them depends upon the number of gearwheels employed and the speed desired; for instance, as shown in Fig. 2, wherein three gearwheels are employed each wheel has three segmental toothed portions, and the spaces between them are equal in extent to two of the segmental toothed portions, so that the teeth of the three gearwheels 23 may successively engage the gearwheels 15; in other words, each segmental toothed portion occupies, in this instance, one-ninth of the circumference of the wheel, and the several toothed portions alternate leaving spaces equal to two-ninths of the circumference of the wheel between them. However, any number of segmental gearwheels may be employed, and the number of segmental toothed portions may be increased or diminished, as desired.

In the operation of a bicycle provided with a transmission gear of the construction hereinbefore described, the shaft 7 is propelled by the cranks and pedals in the usual manner, and the segmental gearwheels 23 being fixed to said shaft will turn therewith and the segmental toothed portions thereof will successively engage the gearwheels 15. As a toothed portion of each segmental gearwheel engages its companion gearwheel the latter will be turned upon the shaft 8, and the lug on said gearwheel engaging the flat spring bar 16 which is connected to the shaft will cause the rotation of the shaft with the gearwheel. The auxiliary shaft 8 is geared to drive the bicycle, as hereinbefore described, and it will be noted that the peculiar form of gearing between the driving gearwheels 23 and said auxiliary shaft is such as to yieldingly apply the power to the driving-wheel of the bicycle, so that the crank-axle may be speeded up intermittently before the power thereof is actually applied; and though this results in reducing the speed of the bicycle as compared with the speed of rotation of the crank-axle considerable power will be gained, as will be obvious. It will be understood, also, that when the bicycle is being propelled on a level grade there will be little or no yielding or loss motion between the driving gearwheels 23 and the auxiliary shaft 8, and in this instance the maximum speed will be attained. Therefore the speed is reduced only when additional power is required, for instance in climbing hills.

In Figs. 4 and 5 of the drawings I have shown my improved transmission gear as applied to an automobile, in which practically the same construction is employed with the exception that the segmental toothed gearwheels are formed integrally; that is to say, the toothed portions, as 25, are formed on a drum 26, the latter being keyed to a shaft 27 having means, as a pulley 28, by which the engine or motor of the automobile is connected to drive said shaft. The segmental toothed portions of the wheel or drum 26 are adapted to mesh or successively engage companion gearwheels 29, loosely mounted on a shaft 33, and each having a lug 30 which is adapted to engage the outer or free end of a flat spring bar 31, said spring bars being each attached to a collar 32 keyed to the shaft 33, as shown in Fig. 6. The gearwheels 29 are each provided with a stop-pin 44, between which latter and the lug 44 the free end of the spring bar is confined, and the spring bar is secured to its collar by means of a setscrew 45. It will be here noted that in order to replace one of the spring-bars that may become broken it is only necessary to loosen the set-screw, withdraw the broken bar and after inserting a new one tighten the setscrew.

For the purpose of gearing the shaft 33 to the driving-wheel of the automobile said shaft is provided with a spur-gear 34 in mesh with a similar gear 35, the latter being keyed to a stub-shaft 36, and the latter also carries a sprocket-wheel 37 over which passes a sprocket-chain 38 to a sprocket-wheel 39 on the hub of the wheel 40.

The shafts 27 and 33 are journaled in the frame-bars 41 of the automobile, and said frame-bars are connected by a cross-bar 42, the provision of the latter being for the purpose of supporting spring pawls 43 which engage the gearwheels 29 and prevent backward rotation of same.

In the application of the invention to an automobile, as shown in Figs. 4 and 5, there are six gear-wheels 29 employed, and there are also employed six segmental toothed portions 25, or one for each gearwheel; but of course the number of gearwheels and number of segmental toothed portions may be increased or diminished, if desired.

From the foregoing description it will be apparent that I provide a very simple, strong, compact and effective transmission gear, which when applied to a bicycle or automobile will give greater power at reduced speed when required, as in climbing a hill, and which will not affect the usual or maximum speed of the gears when running under ordinary conditions, for instance on a level road.

Though I have shown different ways of accomplishing the purpose of my invention, I do not wish to be understood as limiting my protection to the precise constructions illustrated and described, but reserve the right to make such modifications or changes as may be suggested in the practice of the invention; all within the spirit and scope of my claims.

Having described my invention, what I claim as new, and desire to secure by Letters-Patent, is:—

1. In a transmission gear for the purposes set forth, the combination with a driven-shaft, of segmental gearwheels fixed thereto, an auxiliary shaft, gearwheels loosely mounted on the latter and adapted to be engaged by the segmental gearwheels, and springs connecting the loosely mounted gearwheels yieldingly to the shaft, substantially as shown and described.

2. In a transmission gear for the purposes set forth, the combination with a driven-shaft, of segmental gearwheels connected to turn therewith, an auxiliary shaft, gearwheels loosely mounted on the latter and adapted to be engaged by the segmental gearwheels, springs connecting the loosely mounted gearwheels yieldingly to the shaft, and spring pawls engaging the last mentioned gearwheels, substantially as shown and described.

3. In a transmission gear for the purposes set forth, the combination with a shaft, of gearwheels loosely mounted thereon, springs connecting the shaft yieldingly to the gearwheels, and segmental gearwheels connected to each other and arranged to successively engage the aforesaid gearwheels, substantially as set forth.

4. In a transmission gear for the purposes set forth, the combination with a shaft, of gearwheels loosely mounted thereon, flat spring bars fixed to and projecting from the shaft, lugs on the gearwheels adapted to engage the outer or free ends of the flat spring bars, and segmental gearwheels connected together and arranged to mesh successively with the aforesaid gearwheels, substantially as shown and described.

5. In a transmission gear for the purposes set forth, the combination with a shaft, of gearwheels loosely mounted thereon, flat spring bars fixed to and projecting from the shaft, a lug and adjoining stop-pin on each gearwheel between which the free end of the companion spring-bar is confined, pawls engaging said gearwheels, and segmental gearwheels fixed to a driving-shaft and adapted to mesh successively with the aforesaid gearwheels, substantially as shown and described.

6. In a transmission gear for the purposes set forth, the combination with a shaft, of gearwheels loosely mounted thereon, collars attached to the shaft alongside the gearwheels, spring bars fixed to and projecting from said collars, lugs on the gearwheels adapted to engage the outer or free ends of the spring-bars, and pawls engaging the gearwheels; together with segmental gearwheels corresponding in number with the aforesaid gearwheels and adapted to mesh with the same successively.

7. In a bicycle, the combination with the crank-shaft, of a series of segmental gearwheels secured thereto, an auxiliary shaft, gearwheels loosely mounted on the auxiliary shaft, spring bars attached to and projecting from the auxiliary shaft, lugs on the loosely mounted gearwheels adapted to engage the outer ends of the spring bars, and pawls engaging said loosely mounted gearwheels; together with a connection between the auxiliary shaft and driving-wheel of the bicycle, substantially as shown and described.

8. In a bicycle, the combination with the yoked frame-bars 13 and 14, of a crank-shaft 7 mounted therein, a series of segmental gearwheels 23 secured to said shaft, an auxiliary shaft 8 journaled in the frame-bars, gearwheels 15 loosely mounted on the auxiliary shaft, collars 17 secured to the auxiliary shaft, flat spring bars 16 extending tangentially through the collars and engaged at their outer ends of the gearwheels, and set screws securing the spring bars to the collars; the aforesaid segmental gearwheels being adapted to mesh with the loosely mounted gearwheels successively, substantially as described.

9. In a bicycle, the combination with the yoked frame-bars 13 and 14, of a crank-shaft 7 mounted therein, a series of segmental gearwheels 23 secured to said shaft, an auxiliary shaft 8 journaled in the frame-bars, gearwheels 15 loosely mounted on the auxiliary shaft and adapted to be engaged by the segmental gearwheels successively, lugs on one side of the loosely mounted gearwheels, collars 17 secured to the auxiliary shaft, flat spring bars 16 extending tangentially through the collars and so that their outer or free ends will be engaged by the aforesaid lugs, set-screws 20 securing the flat spring bars to the collars, and spring pawls 22 engaging the gearwheels 15; together with gearing between the auxiliary shaft and driving-wheel of the bicycle, substantially as shown and described.

In testimony whereof I have signed my name to this specification in the presence of two subscribing witnesses.

WILLIAM B. SMITH

Witnesses:
H. R. STREETER,
HARRY H. PARTLOW.